UNITED STATES PATENT OFFICE.

LEONARD S. COPELIN, OF MILLERS, NEVADA.

METHOD OF RECOVERING VANADIUM FROM SOLUTIONS.

1,392,745.     Specification of Letters Patent.     Patented Oct. 4, 1921.

No Drawing.     Application filed May 28, 1920. Serial No. 385,025.

*To all whom it may concern:*

Be it known that I, LEONARD S. COPELIN, a citizen of the United States of America, residing at Millers, in the county of Esmeralda and State of Nevada, have invented new and useful Improvements in Methods of Recovering Vanadium from Solutions, of which the following is a specification.

The object of the invention is to facilitate the recovery of vanadium in a form for commercial use from solutions containing impurities such as arsenic and phosphorus, under conditions which will result in a complete elimination of the vanadium and the exclusion of said impurities, and with a view to minimizing the expense both as to time and the cost of re-agents, and with this object in view, the invention consists essentially in reducing the solution to a faintly alkaline condition and then exposing the ingredients thereof to the action of a magnesium salt to act as a scavenger to combine with the arsenic and phosphorus and produce insoluble precipitates.

In carrying out the method, assuming that the solution containing the vanadium is of an alkaline quality, it is preferred to neutralize the same by the addition, whether the solution is hot or cold, of diluted or concentrated sulfuric acid according to whether the solution is only mildly or strongly alkaline, to produce either a neutral or approximately neutral or slightly acid condition. If the solution by this addition is made just neutral or slightly acid, it should be brought back to slight alkalinity by the addition of sodium carbonate ($Na_2CO_3$). To this slightly or more properly speaking faintly alkaline solution, whether hot or cold, should be added a salt of magnesium, either magnesium sulfate, magnesium chlorid, or magnesium oxid either in the solid form or any solution and in amounts which can in either instance be determined by experiment in that it depends upon the amount of vanadium present and the amount of sodium carbonate in the solution as well as the amount of impurities such as arsenic and phosphorus.

The solution should then be heated to a temperature about or above 30 degrees C. and under some circumstances allowed to stand for several hours.

The re-action involves the conversion of the sodium carbonate which has been added as an alkaline re-agent into sodium sulfate, or chlorid (according to whether magnesium sulfate, or magnesium chlorid has been used) while an insoluble hydrated magnesium carbonate is precipitated; and at the same time the arsenic or phosphorus if they be present precipitate as magnesium arsenate and magnesium arsenite and magnesium phosphate and magnesium phosphite, while the vanadium remains in solution.

The precipitate should then be filtered out and the solution containing the vanadium together with the sodium sulfate or chlorid (according to whether or not magnesium sulfate or magnesium chlorid was used) and magnesium sulfate or chlorid should be further treated to recover the vanadium by adding thereto milk of lime preferably in the presence of heat to facilitate the re-action. The lime in the presence of the magnesium salt in the solution precipitates the vanadium in the form of a high quality of calcium magnesium vanadate which may then be recovered by filtration.

The sodium sulfate which remains in the solution and is formed by the reaction of the sulfuric acid and the sodium carbonate, may be recovered from the solution by evaporation and crystallization.

In the event that the original solution to be treated is either neutral or acid, it should be made faintly alkaline by the addition of a suitable quantity of sodium carbonate as in the treatment of the alkaline solution before the introduction of the scavenging re-agent described as above as magnesium salt.

The invention having been described, what is claimed as new and useful is:—

1. In the treatment of solutions for the recovery of vanadium the addition of a magnesium salt.

2. In the treatment of solutions for the recovery of vanadium the method of reducing the same to a faintly alkaline condition and then adding a magnesium salt.

3. In the treatment of solutions for the recovery of vanadium, the method of reducing the same to a faintly alkaline condition and then adding magnesium salt in the presence of heat.

4. In the treatment of solutions for the recovery of vanadium, the method of reducing the same to a faintly alkaline condition and then adding a magnesium salt to combine with arsenic and phosphorus to form insoluble salts.

5. In the treatment of solutions for the recovery of vanadium, the method of reducing the same to a faintly alkaline condition and then adding a magnesium salt to combine with arsenic and phosphorus to form insoluble salts and finally adding a solution containing calcium hydroxid in suspension.

6. A method of recovering vanadium from a solution containing the same which consists in adding a magnesium salt to precipitate the arsenic and phosphorus and treating the remaining solution with milk of lime.

7. A method of recovering vanadium from a solution containing the same which consists in neutralizing the solution by the addition of sulfuric acid, then adding sodium carbonate to produce a faintly alkaline condition, then adding a magnesium salt to precipitate the arsenic and phosphorus present therein as magnesium salts of arsenic and phosphorus, and then adding to the residual solution milk of lime to produce a precipitate of calcium magnesium vanadate.

In testimony whereof I affix my signature.

LEONARD S. COPELIN.